United States Patent [19]

Schweickardt

[11] Patent Number: 4,695,769
[45] Date of Patent: Sep. 22, 1987

[54] LOGARITHMIC-TO-LINEAR PHOTOCONTROL APPARATUS FOR A LIGHTING SYSTEM

[75] Inventor: Karl Schweickardt, Cazenovia, N.Y.

[73] Assignee: Wide-Lite International, San Marcos, Tex.

[21] Appl. No.: 325,378

[22] Filed: Nov. 27, 1981

[51] Int. Cl.⁴ .................................................. H05B 37/02
[52] U.S. Cl. ................................... 315/158; 315/149; 315/134
[58] Field of Search ............... 315/158, 149, 134, 307, 315/291; 323/221; 328/2, 145; 250/214 L, 205

[56] References Cited

U.S. PATENT DOCUMENTS

| | | | |
|---|---|---|---|
| 3,582,659 | 6/1971 | Dekker | 250/214 L |
| 3,723,014 | 3/1973 | Nanba | 250/214 L X |
| 3,971,984 | 7/1976 | Bench | 328/145 X |
| 4,233,564 | 11/1980 | Kerbel | 328/145 |
| 4,236,101 | 11/1980 | Luchaco | 315/158 |

FOREIGN PATENT DOCUMENTS 54-6366  1/1979  Japan ................................. 315/158

Primary Examiner—David K. Moore
Attorney, Agent, or Firm—Vaden, Eickenroht, Thompson & Boulware

[57] ABSTRACT

A photosensor for detecting the light intensity of an external light source, usually the sun, which is illuminating an area is used as the sensor for a control network of an artificial lighting system for that same area to compensate for light intensity variations. The voltage output from the photosensor is applied to a logarithmic-to-linear device which is used as an input to a comparator for producing an inverse output that drives the artificial lighting system. The logarithmic-to-linear device inserts an element into the overall control system that provides compensation that corresponds to the perceived linear light change of intensity that actually occurs when there is an actual logarithmic light change.

6 Claims, 5 Drawing Figures

LOGARITHMIC-TO-LINEAR PHOTOCONTROL APPARATUS FOR A LIGHTING SYSTEM

BACKGROUND OF THE INVENTION

1. Field of the Invention

This invention pertains to regulating apparatus for lighting control systems and more specifically to automatic regulating apparatus for adjusting a lighting system to compensate for the amount of natural daylight or other external light illuminating the work area.

2. Description of the Prior Art

It is frequently desirable for a given work area to receive a desired amount of uniform light intensity even though the individual light from various sources providing illumination of the area may change. For example, if power to the primary lighting system fails, it is desirable to have a backup or standby power supply so that light to the illuminated area can be continuous. If a light burns out or the circuit to a light system fails, it is desirable to have an auxiliary light or lighting system to provide continuous lighting.

Most work areas are provided natural light or daylight through windows to the outside as well as from an internal artificial lighting system. Although rheostats and more sophisticated dimming devices have been around for quite some time, they generally have provided only manual control of the internal lighting system so that, for instance, the lights can be turned up at night when the sun goes down.

More recently, lighting systems have been combined with microprocessors so that lights can be connected, for example, to a time clock for varying the amount of light during particular periods of time. Such a system would work quite satisfactorily to provide a change of light upon the arrival of night time hours, but would not change the amount of light because there was a storm outside, which might be just as darkening of the work area as the sun going down.

It has been known that it might be possible to automatically control the amount of voltage to a lamp driver using a photosensitive device. That is, a typical photosensor produces a voltage proportional to or inversely proportional to the sensed light intensity. By using this voltage to drive a lamp system, it would seem that it would be easy to compensate for variation in the externally sensed light. That is, as the external light dims, the inside light would be made brighter. As the external light becomes brighter, then the inside light would be made dimmer.

However, the light intensity from the sun varies over an extremely wide dynamic range, on the order of illuminating an area with an intensity of from about $10^4$ foot candles to $10^{-5}$ foot candles. The eye perceives a logarithmic change of light intensity as a linear change of brightness. Therefore, a proportionally linear change of voltage with light intensity would not produce the desired result of the control system. An attempt has been made to produce a non-linear drive voltage to the lamp circuit using non-linear potentiometric resistors and an operational amplifier connected as a comparator. The theory is that the ratio of the bias resistor to feedback resistor would result in a non-linear drive voltage from the comparator for connection to the lamp or lamp system. However, it is virtually impossible to reliably synchronize non-linear potentiometers and therefore such a theoretical control regulator has not proven to be commercially feasible.

Therefore, it is a feature of this invention to provide an improved photocontrolled apparatus suitable for compensating a lighting system to compensate for variation in the light intensity of an external light illuminating the same area as such lighting system.

It is another feature of this invention to provide an improved lighting control system incorporating a logarithmic-to-linear device in such a manner to compensate for the natural logarithmic change of lighting that occurs from the sun, which is over a wide dynamic range.

SUMMARY OF THE INVENTION

Lighting system control is achieved which employs a photosensor connected to a logarithmic-to-linear conversion device. The output of the conversion device is connected to the input of a comparator having its other input established to a reference voltage. A logarithmic change of input results in a stepped linear input change to the comparator, having a similar influence on the output. By making such output to be inverse in direction to the input it is possible to provide the desired compensation. The bias and feedback resistors of the comparator provide hysteresis to the control apparatus so that no sudden change of the controlled system results from a sudden change of the sensed external light.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings.

DESCRIPTION OF THE PREFERRED EMBODIMENT

Figure 1:
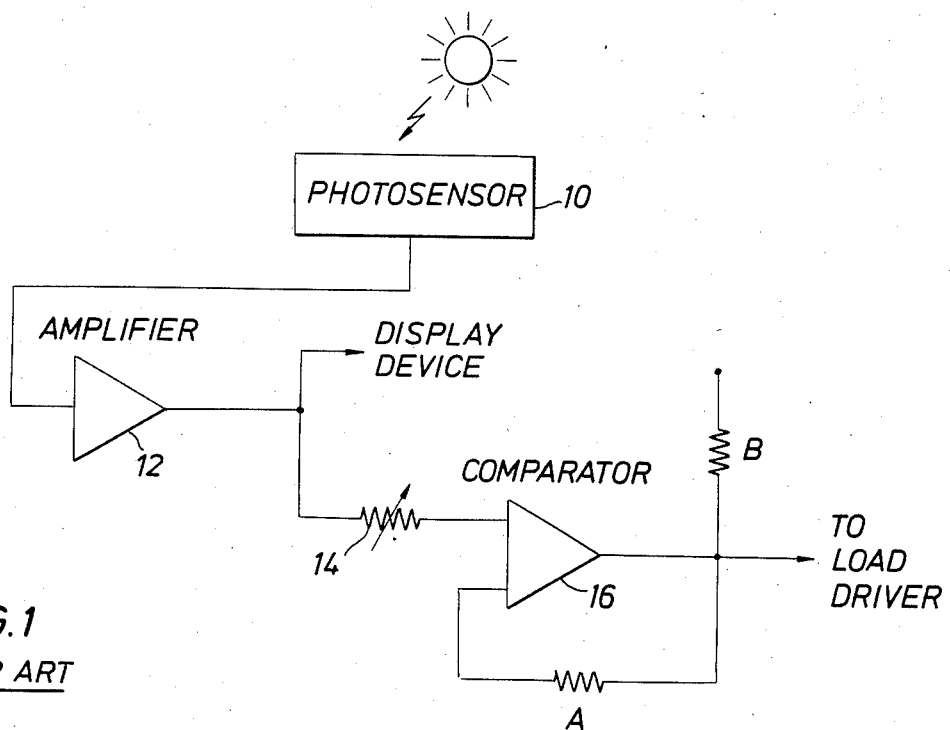
FIG. 1 is a simplified block diagram of the prior art system which is the closest known to applicant to the present invention.

Now referring to the drawings and first to FIG. 1, a simplified block diagram of a prior art scheme is shown. Photosensor 10 senses or detects the light intensity of the light from the sun as it strikes in the area to which light is to be controlled. Typically, the detector point is at the window to the outside through which sunlight is received. Although this is probably the most common application, the external light source may be another lighting system. Another example of an external light source would be lights from a shopping mall, an individual store lights being the controlled lighting system. The photosensor produces a voltage over a wide dynamic range proportional to the light intensity of the sun or other externally sensed light.

The voltage is isolated and amplified in amplifier 12 and can be displayed for monitoring purposes either on a meter, a light scale or similar display device, if desired. This output is also applied through a variable input resistor 14 to one of the inputs of an operational amplifier connected as comparator 16. The other input to comparator 16 is to feedback resistor A, which with bias resistor B forms the reference voltage for the comparator. By appropriate selection of values, it is possible to make the reference value such that the light from the controlled system is at its dimmest when the input from the photosensor is at its greatest. Hence, the control voltage is inversely proportional to the input voltage. The hysteresis action of the comparator is also dependent upon the A/B resistance ratio. The output is applied to the load driver that applies voltage to the controlled lighting system.

Since the dynamic range of the input is so large, in any kind of a practical system, it is necessary to vary the values of A and/or of B to be suitable for the absolute value of voltage applied via resistor 14. Synchronized mechanical components for this purpose are not available and, therefore, it is more proper to characterize FIG. 1 as a theoretical prior art system than as a practical one.

Figure 2:
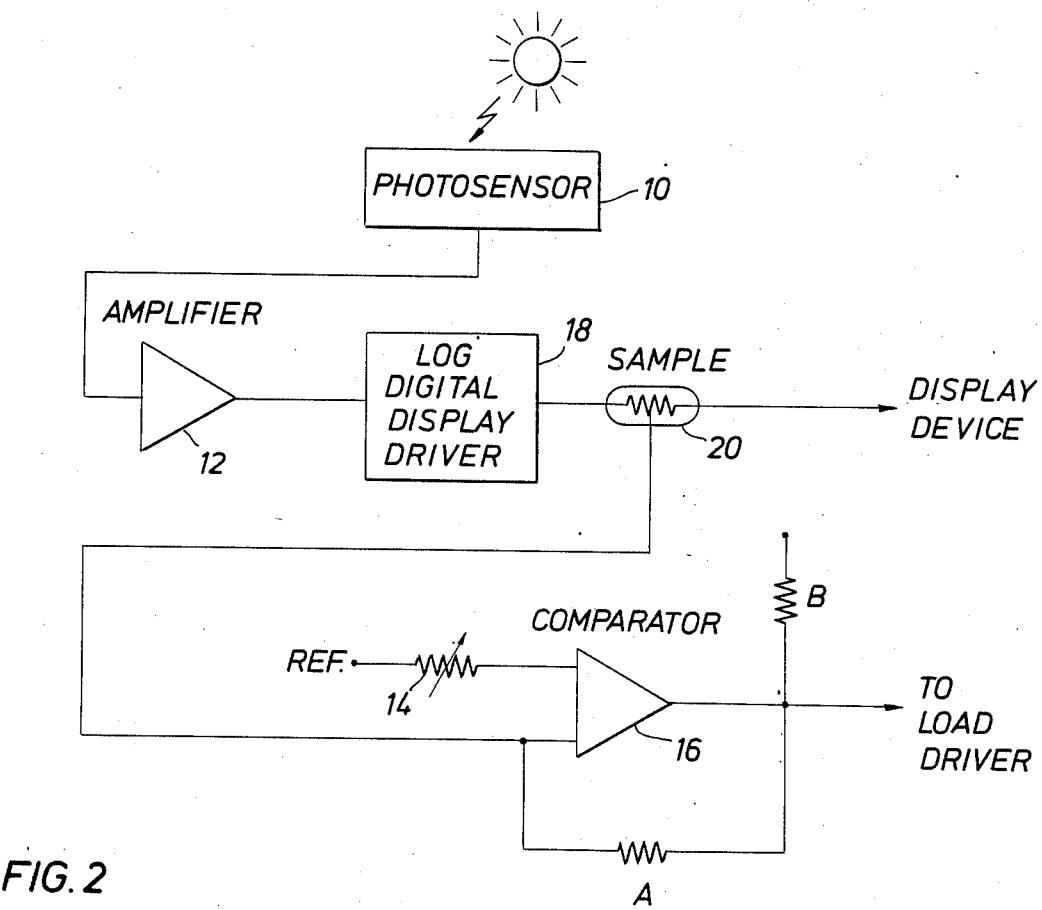
FIG. 2 is a simplified block diagram of a preferred embodiment of the present invention.

FIG. 2 illustrates a practical and preferred system in accordance with the present invention. Photosensor 10 again produces a voltage output which is proportional to the sensed light intensity of the sun or other externally controlling light. The input is applied to a logarithmic digital display driver 18 made up of integrated circuit components, such as National Semiconductor LM 3915. A logarithmic input to such a device produces a linear voltage output, which is sampled across resistor 20. This sampled across resistor 20 may also be used to drive an indicating display device, as shown.

The sampled output from resistor 20 is applied to one of the inputs to comparator 16, whose other input is connected through a variable resistor 14 to a fixed reference. This connection provides the inverse voltage operation necessary for controlling the controlled lighting system, as described above with respect to the system shown in FIG. 1. The non-reference input is also connected to feedback resistor A. The hysteresis operation of the comparator is again determined by the ratio of bias resistor B to feedback resistor A. The output of the comparator is connected to the load driver of the controlled lighting.

Figure 3:
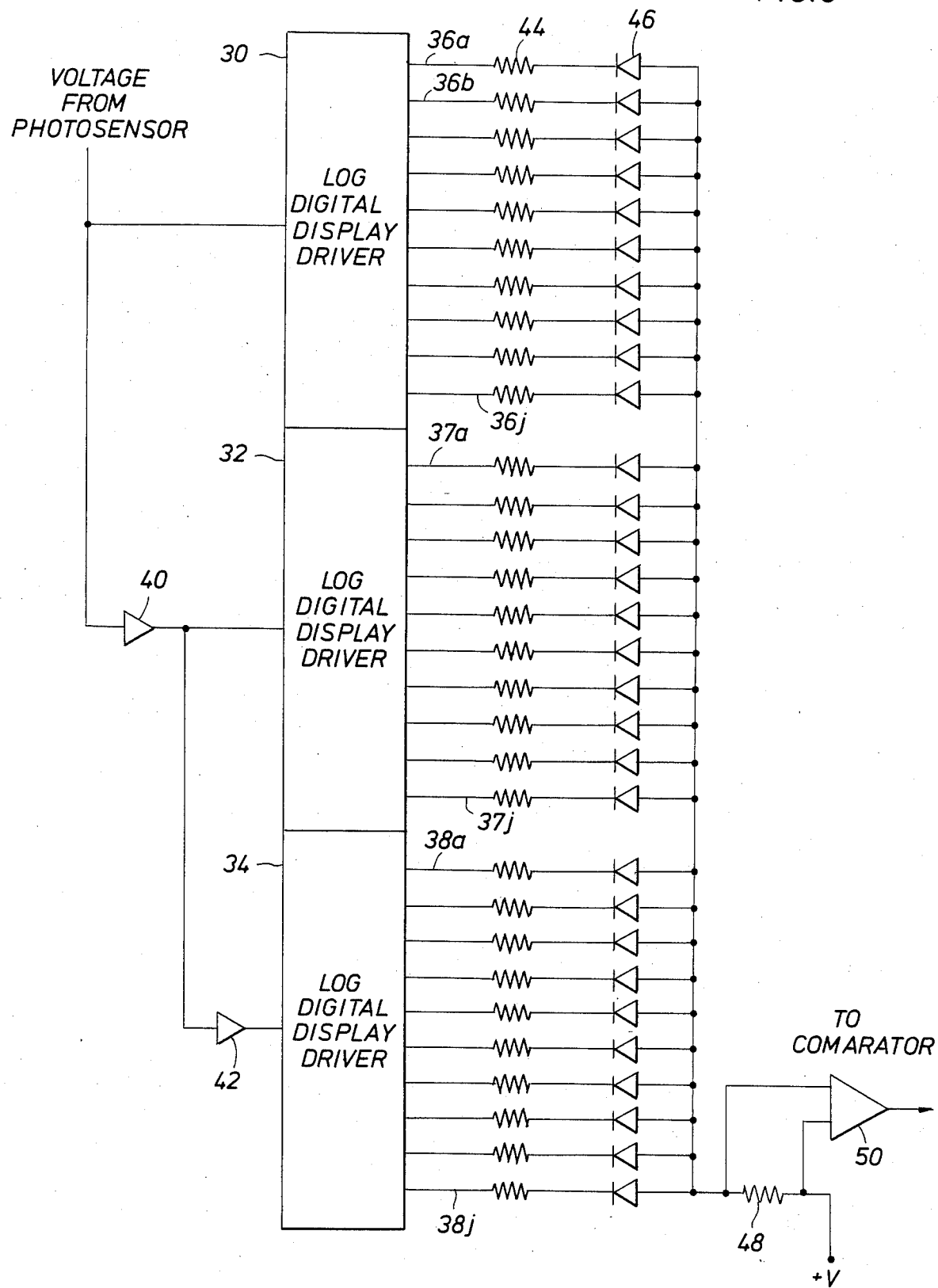
FIG. 3 is a simplified schematic/block diagram of a logarithm-to-linear conversion means for connection in the preferred embodiment of the system shown in FIG. 2.
Figure 4:
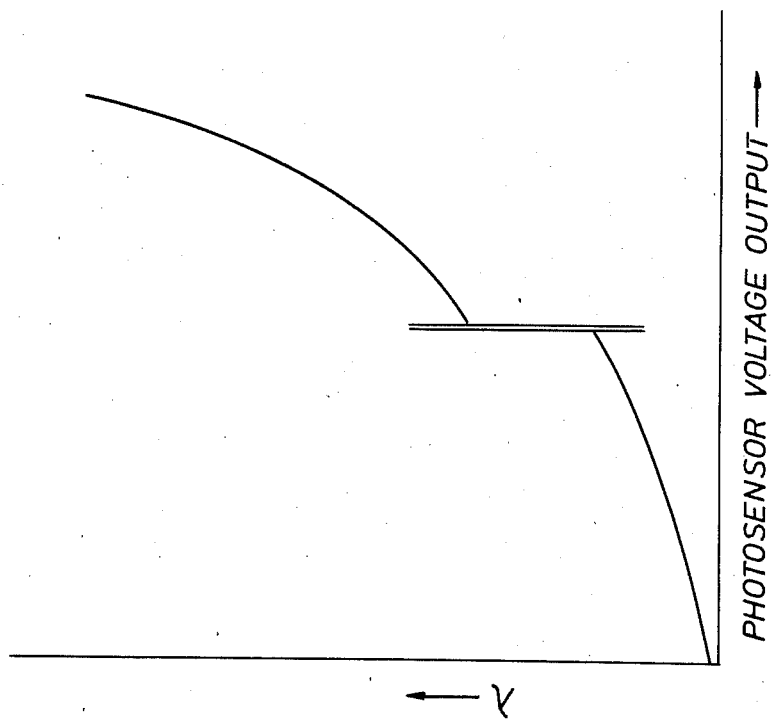
FIG. 4 is a graphic illustration of the light-intensity-to-voltage response of a photosensor employed in a preferred embodiment of the present invention.

Now turning to FIG. 3, a network is shown for producing a linear voltage output in steps from an applied logarithmically changing input voltage. The network illustrated comprises three logarithmic display driver sections 30, 32 and 34 serially connected together. These sections are preferably National Semiconductor LM 3915 networks, each having ten outputs. Internal to each network are a series of threshold devices coupled with logic gating devices. As the voltage input progresses along a longitudinal curve, there is produced first a constant-current output on line 36a, then an equal and second constant current output on line 36b and so forth through line 36j. The threshold settings are logarithmic and hence the conversion relationship of input to output. The detected change in light intensity, represented by the symbol "λ" in FIG. 4, produces a corresponding and proportional change in input voltage.

The human eye is a photoreceptor that responds logarithmically to a change in light intensity. That is, for a logarithmic change of light intensity of a given amount, there is a perceived change of a linear amount. Therefore, even though the brightness of daylight varies under normal conditions over a very wide dynamic range when measured in absolute foot candles, for instance, a person sees only slightly less well when the daylight is considerably less bright than when light is at a comfortable level. And, on the other side of the brightness range, a further change of brightness when the daylight is already quite bright does not cause a linearly corresponding visual awareness of brightness increase.

Figure 5:
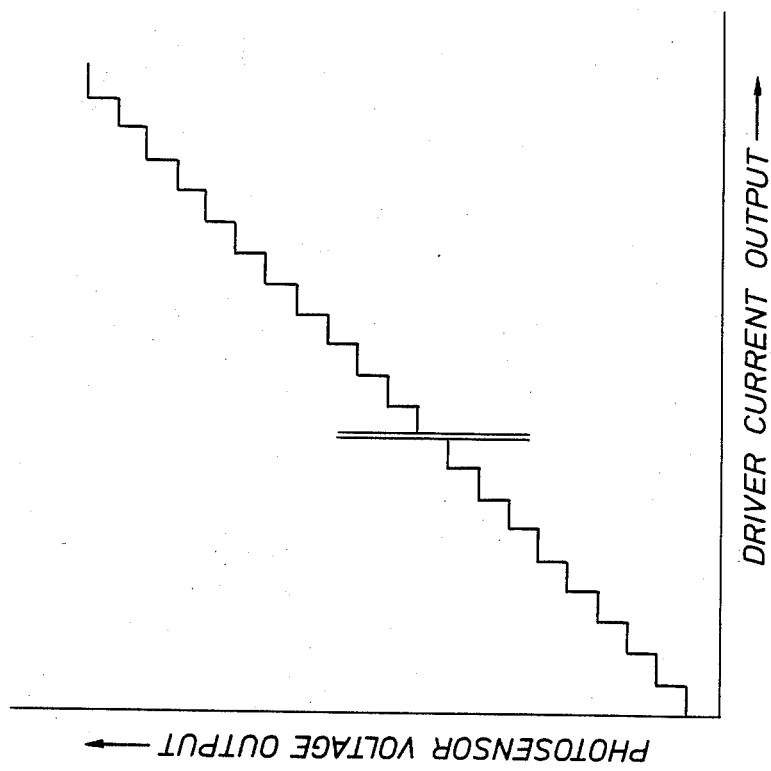
FIG. 5 is a graphic illustration of the stepped linear output of a logarithm-to-linear converter employed in a preferred embodiment of the present invention.

FIG. 5 shows the relationship of the photosensor output to the driver current output appearing on lines 36a-36j, on corresponding lines 37a-37j from second section 32 and on lines 38a-38j from section 34. It may be noted that a voltage divider or dropping device 40 is connected in the input line to second section 32 and a similar device 42 is connected in the input to device 34 so that the overall response to the input over its entire dynamic range is represented by thirty linear steps.

Each time the voltage input rises the logarithmic increment to produce another output, there is produced a constant current increment through a linear resistor 44 and an LED 46, which may be located as a visual display device to the observer. The outputs from the LED's are connected to a common point for application to a resistor 48 biased to a bias voltage "V+". Resistor 48 converts the stepped current change to a stepped voltage change which is sampled as the input to ampifier 50 (sample 20 in FIG. 2) and applied as the variable sensing input to comparator 16.

It may be noted that a LM 3915 logarithmic display driver is conventionally employed with its related LED's in an audio application. The ear, like the eye, is a logarithmic sensitive device. As the volume increases, represented by a proportional voltage, there is an output indication of the serially aligned LED's. That is, these LED's light and extinguish to produce a ribbon indication in linear fashion related to the detected logarithmic volume change.

In the present application, the sampled output to comparator 16 from the logarithmic-to-linear network just described produces an output closer and closer to the reference set on the other input to the comparator. As a result, the comparator output, representing the voltage difference in the inputs, drives the lamp system less for a brighter externally sensed light (most frequently, the sun). Because of the connection of the input at the same point as that of the feedback resistor, there is an accumulative effect, not only to maintain the respective proportion between the external and internal light levels, but also the amount of hysteresis in the system. A very sudden change of light will produce large hysteresis and, hence, no change of internal lighting. A gradual change of outside lighting, on the other hand, will be followed by a corresponding gradual change of internal lighting, which is the ideal light compensation desired.

While a particular embodiment of the invention has been shown and described, it will be understood that the invention is not limited thereto since many modifications may be made and will become apparent to those skilled in the art.

What is claimed is:

1. Photocontrol apparatus for logarithmically regulating the output of a controlled light to compensate for the logarithmic change in the intensity of a sensed external light being perceived as linear to the eye, the output of said controlled light being linearly dependent on the voltage applied thereto, comprising a comparator, the output voltage of which is connected to the controlled light, said comparator output being the difference between an applied reference voltage and a sampled control voltage, and means for producing said control voltage, including photosensing means for sensing the external light and converting sensed light intensity therefrom to a voltage proportional thereto, and logarithm-to-linear conversion means connected to said photosensing means for producing a linearly changing output voltage with a logarithmically changing input voltage, a sample of said output voltage being connected as the sampled control voltage to said comparator, the output from said comparator logarithmically varying the intensity of the controlled light to perceptually visually compensate for changes in the intensity of the sensed light.

2. Photocontrol apparatus in accordance with claim 1, and including variable means for applying the reference voltage to said comparator for establishing the brightness range for the controlled light.

3. Photocontrol apparatus in accordance with claim 1, and including hysteresis means connected to the input of said comparator with said sampled control voltage to produce changes of the controlled light in accordanne with a hysteresis curve with changes in the sensed light intensity, and thereby smoothing the effects of abrupt changes therein.

4. Photocontrol apparatus in accordance with claim 1, wherein said logarithm-to-linear conversion means includes a current driver having multiple outputs, each of which is at a constant current level as it is sequentially stepped produced in linear fashion with a logarithmic change of voltage input to said conversion means, and a current-to-voltage network connected to said multiple outputs.

5. Photocontrol apparatus in accordance with claim 4, wherein said current-to-voltage network includes a common set point connection for said multiple outputs from said conversion means, and a voltage dropping resistor for developing said control voltage.

6. Photocontrol apparatus in accordance with claim 4, wherein each of said multiple outputs includes a display device for indicating the presence of the respective current outputs.

* * * * *